US011838219B1

(12) United States Patent
Sun et al.

(10) Patent No.: US 11,838,219 B1
(45) Date of Patent: Dec. 5, 2023

(54) EVENT SUBSCRIPTION FOR SERVICEABILITY VIA BIDIRECTIONAL PROXY

(71) Applicant: Dell Products L.P., Round Rock, TX (US)

(72) Inventors: Yun Sun, Shanghai (CN); Joan Jun Xiong, Shanghai (CN); Zheng Zhang, Shanghai (CN); Weiyi Xie, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/963,856

(22) Filed: Oct. 11, 2022

(30) Foreign Application Priority Data

Sep. 28, 2022 (CN) .......................... 202211193600.5

(51) Int. Cl.
| | |
|---|---|
| *G06F 15/16* | (2006.01) |
| *G06F 15/173* | (2006.01) |
| *H04L 47/762* | (2022.01) |
| *H04L 47/70* | (2022.01) |
| *H04L 47/783* | (2022.01) |

(52) U.S. Cl.
CPC .......... *H04L 47/762* (2013.01); *H04L 47/783* (2013.01); *H04L 47/828* (2013.01)

(58) Field of Classification Search
None
See application file for complete search history.

(56) References Cited

U.S. PATENT DOCUMENTS

| | | | | |
|---|---|---|---|---|
| 6,654,796 B1* | 11/2003 | Slater | ................... | H04L 41/0273 |
| | | | | 709/236 |
| 7,478,152 B2* | 1/2009 | Holt | ........................ | H04L 63/10 |
| | | | | 709/224 |
| 7,818,436 B2* | 10/2010 | Gallant | ................. | G06F 21/805 |
| | | | | 709/224 |
| 2011/0292807 A1* | 12/2011 | Shah | ..................... | H04W 28/14 |
| | | | | 370/235 |
| 2014/0059226 A1* | 2/2014 | Messerli | ................. | H04L 67/51 |
| | | | | 709/226 |
| 2015/0215414 A1* | 7/2015 | Kariman | ................. | H04L 67/55 |
| | | | | 709/223 |
| 2019/0058772 A1* | 2/2019 | Ruiz-Meraz | .......... | H04L 51/214 |
| 2020/0250058 A1* | 8/2020 | Bhatia | ....................... | G06F 8/61 |

\* cited by examiner

*Primary Examiner* — Christopher B Robinson
(74) *Attorney, Agent, or Firm* — Jackson Walker L.L.P

(57) ABSTRACT

Disclosed methods provision a host with a pair of proxy resources. A first proxy resource may be configured to forward traffic from an in-band management interface of the host to a link-local interface of a BMC or the like. The second proxy resource is configured to forward traffic received via a link-local interface of the host to a management network interface of a cluster manager. Upon receiving an event subscription message from the cluster manager via the in-band management interface of the host, the event subscription message is forwarded by the first proxy to the link-local interface of the BMC to register a link-local interface of the host as a subscriber for one or more events. Responsive to receiving an event notification from the BMC via the link-local interface of the host, the event notification is automatically forwarded to the management network interface of the cluster manager.

15 Claims, 2 Drawing Sheets

EVENT SUBSCRIPTION FOR SERVICEABILITY VIA BIDIRECTIONAL PROXY

TECHNICAL FIELD

The present disclosure relates to system management and, more specifically, handling of event driven notification messages.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information technology (IT), which may be defined for purposes of this disclosure as the use of information handling systems to obtain, analyze, and disseminate data and other information, is an increasingly important consideration for commercial, industrial, governmental, educational, and social endeavors. For many enterprises, a critical component of IT is systems management, i.e., functionality enabling enterprise-wide administration of information handling systems and other IT assets. Systems management resources may be responsible for monitoring various metrics pertaining to the availability, utilization, performance, configuration, security, and health of IT assets. At least some of these tasks may involve event-driven messaging communicated between event sources, e.g., a hardware event generated by a hardware component of a system, and the system management resource. Servers and other types of information handling systems may be provisioned with hardware dedicated to implementing and supporting systems management tasks. A baseboard management controller (BMC) is well known example of management controller hardware. Typically, a BMC includes its own processor and storage as well as its own dedicated network interface for coupling the BMC to a remote management resource via a management network. The BMC network interface may be referred to as an out-of-band (OOB) interface.

In some instances, an entity's cluster management resource excludes the BMC's dedicated OOB interface, thereby preventing the BMC from communicating event notifications to the cluster management resource via the OOB interface. This issue may be addressed by provisioning a proxy in the host operating system (OS) to forward traffic from the host's management interface to the BMC by way of a link-local network. However, because link-local network traffic cannot be routed to another network, the cluster management resource may be required to establish a persistent or keep-alive connection between the proxy and the BMC to monitor event notifications. In the case of a large scale cluster, hundreds or thousands of persistent connections would be required to support event notification messaging. Accordingly, an alternative solution would be preferable.

SUMMARY

Problems associated with supporting event notifications in a multi-host cluster environment are addressed by disclosed methods and systems. Disclosed methods may provision a host with a pair of proxy resources. A first proxy resource may be configured to forward traffic from an in-band management interface of the host to a link-local interface of a management controller, a BMC iDRAC, or the like. The second proxy resource is configured to forward traffic received via a link-local interface of the host to a management network interface of a cluster manager. Upon receiving an event subscription message from the cluster manager via the in-band management interface of the host, the event subscription message is forwarded by the first proxy to the link-local interface of the management controller to register a link-local interface of the host as a subscriber for one or more events. Thereafter, responsive to receiving an event notification from the management controller via the link-local interface of the host, the event notification is automatically forwarded to the management network interface of the cluster manager.

In some embodiments, the link-local interface and networks is implemented as USB. The cluster may be implemented as an HCI cluster using one or more HCI appliances to provide the cluster nodes. In at least some embodiment, wherein, the management controller comprises a baseboard management controller (BMC) or a suitable alternative or equivalent. In some embodiments, the BMC may be provisioned with a dedicated OOB network interface generally used for communicating management traffic with the cluster manager, but the cluster manager may have excluded the OOB interface from the management domain, rending the management controller unable to communication directly with the cluster manager.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
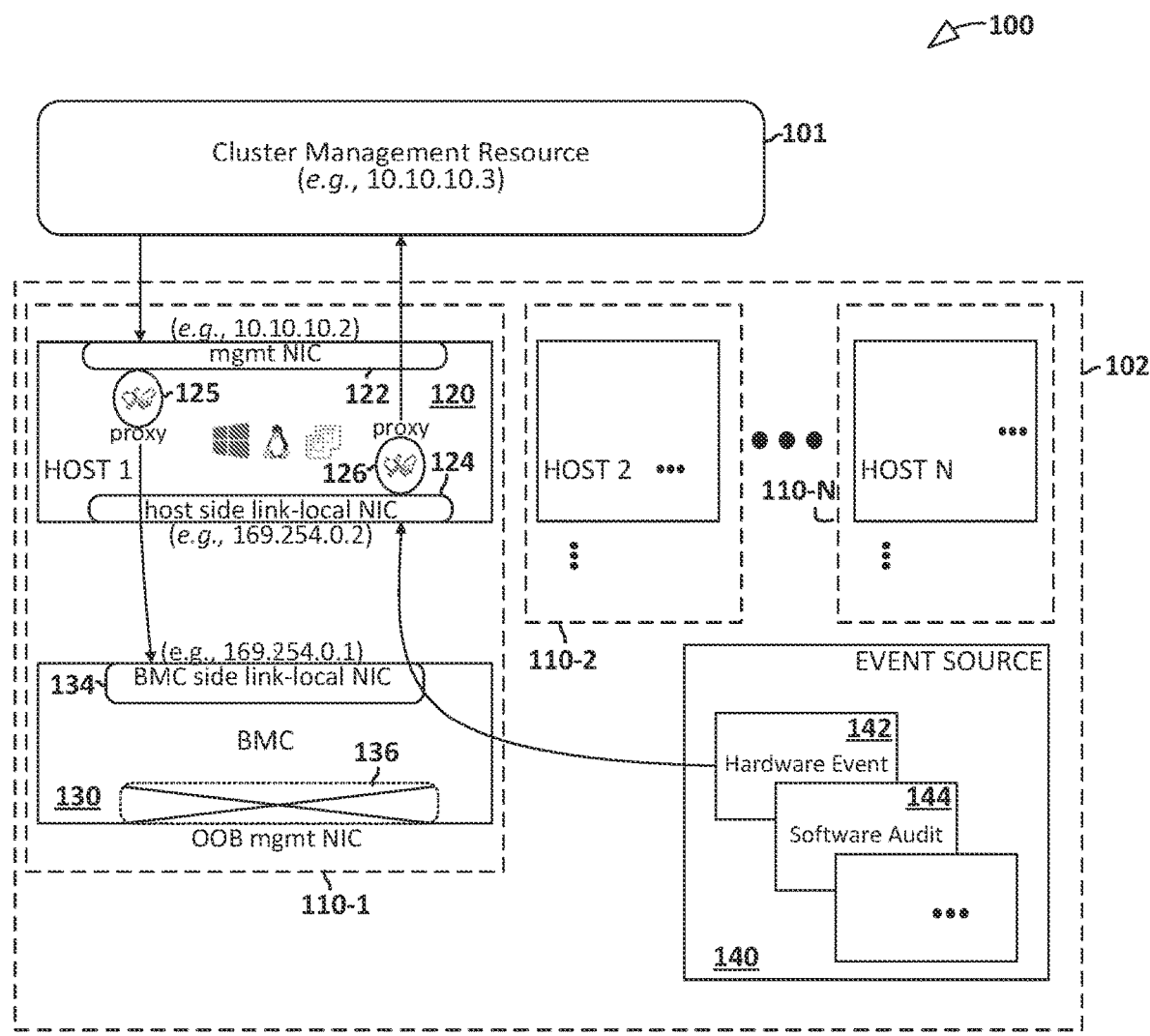
FIG. 1 illustrates a cluster platform in accordance with disclosed teachings.
Figure 2:
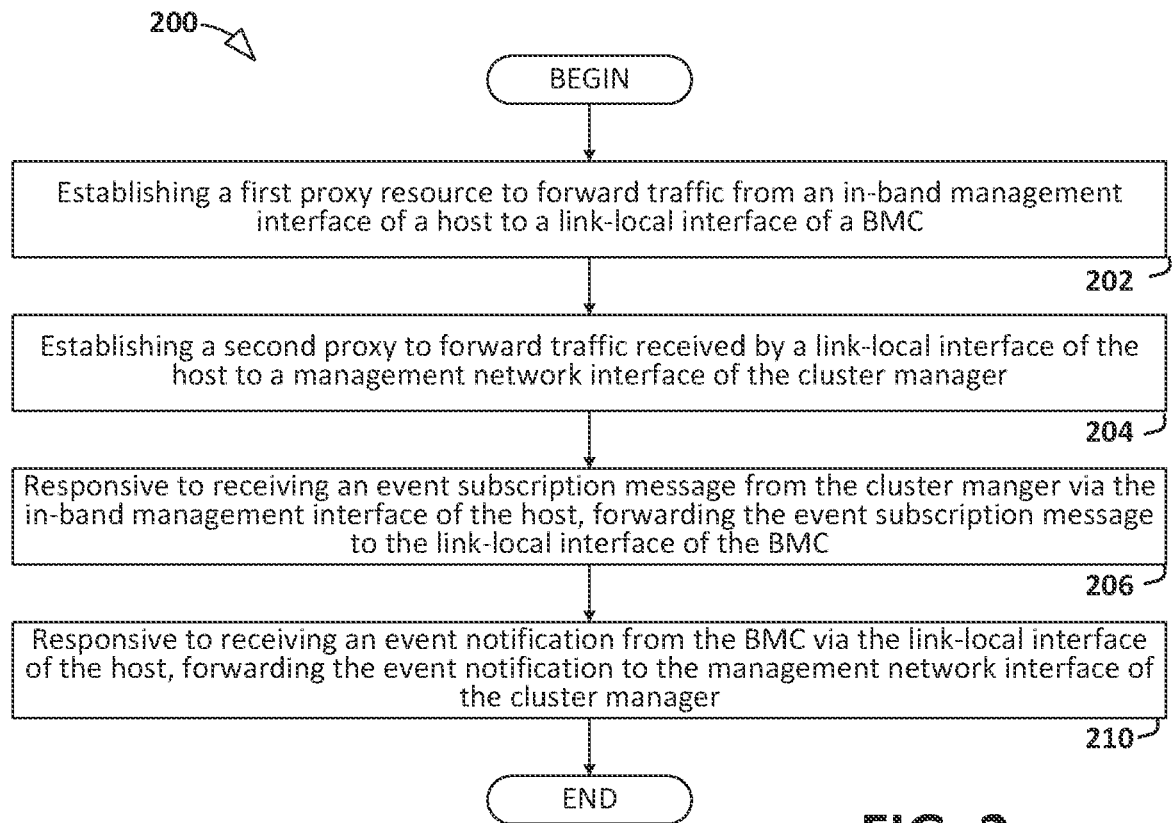
FIG. 2 is a flow diagram illustrating a management method suitable for the cluster environment of FIG. 1.
Figure 3:
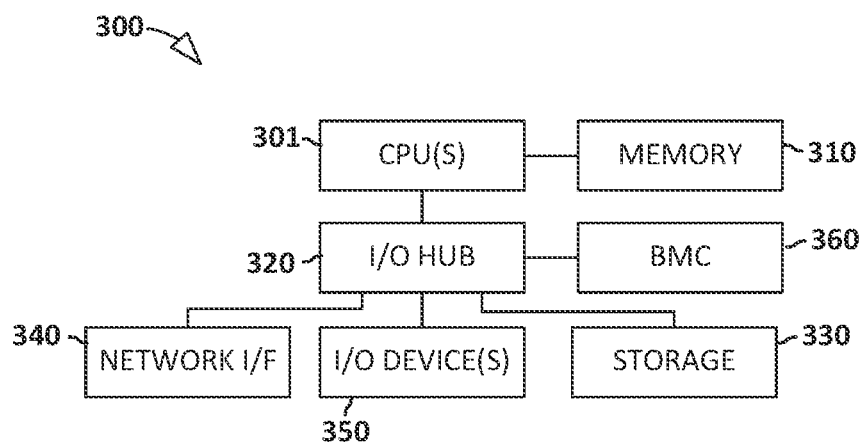
FIG. 3 illustrates an information handling system suitable for use in conjunction with features and teachings of FIG. 1 and FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary distributed computing platform 100 suitable for use in conjunction with disclosed teachings for implementing bidirectional proxies to support event subscription for serviceability in a cluster computing environment. The illustrated platform 100 includes a cluster management resource referred to herein as cluster manager 101, configured to manage an information handling system cluster, referred to herein simply as cluster 102. The cluster 102 illustrated in FIG. 1 encompasses a plurality of nodes 110, including a first node 110-1, a second node 110-2, and so forth. In at least some embodiments, each node 110 corresponds to a physical hardware device. For example, each node 110 may correspond to a hyper-converged infrastructure (HCI) appliance, i.e., a server class computing system with HCI software for implementing virtualized compute, storage, and networking resources, all exposed to a central and automated management resource, e.g., cluster manager 101. In some such embodiments, some or all of the HCI appliances may be implemented with any of the line of VxRail HCI appliances from Dell Technologies.

As exemplified by the first node 110-1, each node 110 may include a host resource, referred to herein simply as host 120, and a management controller such as the BMC 130 illustrated in FIG. 1. In at least some embodiments, BMC 130 may be implemented with an iDRAC from Dell Technologies or another suitable management controller resource.

The event sources 140 depicted in FIG. 1 encompass some or all sources of event driven messages that platform 100 might generate during operation. The event sources 140 shown in FIG. 1 include, as non-limiting examples, hardware events 142, software audit events 144, and other events that will be familiar to those of ordinary skill in the field of systems management and distributed systems. Event drive notification messages are an important component in many system management implementations.

As depicted in FIG. 1, host 120 includes a management network interface card (NIC) 122, coupling host 120 with a network interface (not explicitly depicted in FIG. 1) of cluster manager 101, and a link-local NIC 124 coupling host 120 with a link-local NIC 134 of BMC 130. As indicated by their 169.254.x.x IP addresses, the network to which link-local NICs 124 and 134 are interfaced is a link-local network. In at least some embodiments, this link-local network coupling host 120 and BMC 130 is a Universal Serial Bus (USB) interconnect.

Because traffic on a link-local network will not be routed, BMC 130 cannot communicate directly with any resource that is not connected to the link-local network. In addition, although the BMC 130 illustrated in FIG. 1 includes a dedicated out-of-band (OOB) NIC 136 with which BMC 130 might communicated with cluster manager 101, COB NIC 136 is shown in dotted lines to convey that it has been excluded from the domain of cluster manager 101. Thus, as illustrated in FIG. 1, BMC 130 and cluster manager 101 are effectively unable to communicate with each other directly, thereby preventing BMC 130 from send event notification messages directly to cluster manager 101.

Despite the unavailability of a dedicated OOB NIC within BMC 130, the platform 100 illustrated in FIG. 1 supports event-driven notification messages without increasing in-band traffic and or requiring dedicated and persistent communication channels between BMC 130 and cluster manager 101.

To support event-based notification messages, host 120 has been provisioned with two proxy resources. A first proxy resource 125 is configured to forward network traffic received by management NIC 122 of host 120 from cluster manager 101 to the BMC link-local NIC 134 of BMC 130. For example, forward traffic received at IP/port 10.10.10.2: 6044 to 169.254.0.1:443. A second proxy resource 126 is configured to forward network traffic received by the link-local NIC 124 of host 120 from BMC NIC 134 to cluster manager 101. For example, forward traffic received at IP/port 169.254.0.2:9001 to 10.10.10.3:8000.

With the two proxy resources 125, 126 configured, the illustrated platform 100 supports event driven messaging for serviceability as follows. Cluster resource 101 communicates an event subscription message to BMC 130 to register host link-local NIC 124 as a subscriber, e.g., subscriber IP: 169.254.0.2, port 9001. The subscription message is first sent to management NIC 122 of host 120, where the message is forwarded by first proxy resource 125 to BMC link-local NIC 134.

As the platform 100 operates, event notification messages are generated by event sources 140 and communicated to BMC 130. BMC 130 responds to receiving event notifications by forwarding the notifications to host link-local NIC 124 via the link-local interconnect, e.g., a USB connection. When event notifications arrive at host link-local NIC 124, the second proxy resource 126 forwards the event notifications to cluster manager 101, which is configured to perform required or desired serviceability functions.

Turning now to FIG. 2, a flow diagram illustrates a cluster management method 200 for supporting event subscriptions for serviceability via disclosed proxies. In accordance with the illustrated method 200, a first proxy resource is established (step 202) to forward traffic from an in-band management interface of the host to a link-local interface of a BMC, e.g., BMC, iDRAC, etc., of the host. A second proxy is then established (step 204) to forward traffic received by a link-local interface of the host to a management network interface of the cluster manager. Upon receiving an event subscription message from the cluster manager via the in-band management interface of the host, the event subscription message is forwarded (step 206) by the first proxy to the link-local interface of the BMC to register a link-local interface of the host as a subscriber for one or more events indicated in the event subscription message. Responsive to receiving an event notification from the BMC via the link-local interface of the host, the event notification is forwarded (step 210) to the management network host interface of the cluster manager.

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing an information handling system cluster, the method comprising:

establishing, on a host within the cluster, a first proxy resource to forward traffic from an in-band management interface of the host to a link-local interface of a management controller of the host;

establishing, on the host, a second proxy to forward traffic received via a link-local interface of the host to a management network interface of a cluster manager;

responsive to receiving an event subscription message from the cluster manager via the in-band management interface of the host, forwarding the event subscription message to the link-local interface of the management controller to register a link-local interface of the host as a subscriber for one or more events indicated in the event subscription message; and responsive to receiving an event notification from the management controller via the link-local interface of the host, forwarding the event notification to the management network host interface of the cluster manager.

2. The method of claim 1, wherein the link-local interface comprises a universal serial bus interface.

3. The method of claim 1, wherein the cluster comprises a hyperconverged infrastructure (HCI) cluster and wherein the HCI cluster includes a plurality of HCI hosts.

4. The method of claim 1, wherein the management controller comprises a baseboard management controller (BMC).

5. The method of claim 4, wherein the BMC includes an out-of-band interface and wherein the cluster manager is configured to exclude the out-of-band interface of the BMC.

6. An information handling system, comprising:

a central processing unit (CPU); and a computer readable memory, accessible to the CPU, including processor executable instructions that, when executed by the CPU, cause the system to perform cluster management operations comprising:

establishing, on a host within the cluster, a first proxy resource to forward traffic from an in-band management interface of the host to a link-local interface of a management controller of the host;

establishing, on the host, a second proxy to forward traffic received via a link-local interface of the host to a management network interface of a cluster manager;

responsive to receiving an event subscription message from the cluster manger via the in-band management interface of the host, forwarding the event subscription message to the link-local interface of the management controller to register a link-local interface of the host as a subscriber for one or more events indicated in the event subscription message; and responsive to receiving an event notification from the management controller via the link-local interface of the host, forwarding the event notification to the management network host interface of the cluster manager.

7. The information handling system of claim 6, wherein the link-local interface comprises a universal serial bus interface.

8. The information handling system of claim 6, wherein the cluster comprises a hyperconverged infrastructure (HCI) cluster and wherein the HCI cluster includes a plurality of HCI hosts.

9. The information handling system of claim 6, wherein the management controller comprises a baseboard management controller (BMC).

10. The information handling system of claim 9, wherein the BMC includes an out-of-band interface and wherein the cluster manager is configured to exclude the out-of-band interface of the BMC.

11. A non-transitory computer readable medium including processor-executable instructions that, when executed by a processor, cause the processor to perform cluster management operations comprising:

establishing, on a host within the cluster, a first proxy resource to forward traffic from an in-band management interface of the host to a link-local interface of a management controller of the host;

establishing, on the host, a second proxy to forward traffic received via a link-local interface of the host to a management network interface of a cluster manager;

responsive to receiving an event subscription message from the cluster manger via the in-band management interface of the host, forwarding the event subscription message to the link-local interface of the management controller to register a link-local interface of the host as a subscriber for one or more events indicated in the event subscription message; and responsive to receiving an event notification from the management controller via the link-local interface of the host, forwarding the event notification to the management network host interface of the cluster manager.

12. The computer readable medium of claim 11, wherein the link-local interface comprises a universal serial bus interface.

13. The computer readable medium of claim 11, wherein the cluster comprises a hyperconverged infrastructure (HCI) cluster and wherein the HCI cluster includes a plurality of HCI hosts.

14. The computer readable medium of claim 11, wherein the management controller comprises a baseboard management controller (BMC).

15. The computer readable medium of claim 14, wherein the BMC includes an out-of-band interface and wherein the cluster manager is configured to exclude the out-of-band interface of the BMC.

\* \* \* \* \*